(12) United States Patent
Poe et al.

(10) Patent No.: US 11,493,717 B2
(45) Date of Patent: Nov. 8, 2022

(54) FIBER OPTIC CABLE DISTRIBUTION AND MANAGEMENT SYSTEM

(71) Applicant: Google LLC, Mountain View, CA (US)

(72) Inventors: Charles Poe, Palo Alto, CA (US);
Mathew Berg, Charleston, SC (US)

(73) Assignee: Google LLC, Mountain View, CA (US)

( * ) Notice: Subject to any disclaimer, the term of this patent is extended or adjusted under 35 U.S.C. 154(b) by 132 days.

(21) Appl. No.: 16/944,288

(22) Filed: Jul. 31, 2020

(65) Prior Publication Data
US 2022/0035112 A1 Feb. 3, 2022

(51) Int. Cl.
*G02B 6/00* (2006.01)
*G02B 6/44* (2006.01)
*G02B 6/38* (2006.01)

(52) U.S. Cl.
CPC ......... *G02B 6/4452* (2013.01); *G02B 6/3897* (2013.01)

(58) Field of Classification Search
CPC .... G02B 6/4452; G02B 6/3897; G02B 6/444; G02B 6/00
See application file for complete search history.

(56) References Cited

U.S. PATENT DOCUMENTS

| | | | |
|---|---|---|---|
| 5,142,606 A | | 8/1992 | Carney et al. |
| 5,778,130 A | * | 7/1998 | Walters ................ G02B 6/4455 385/134 |
| 6,920,273 B2 | | 7/2005 | Knudsen |
| 6,920,274 B2 | | 7/2005 | Rapp et al. |
| 7,083,051 B2 | | 8/2006 | Smith et al. |
| 7,995,357 B2 | | 8/2011 | Hruby et al. |
| 9,348,106 B2 | | 5/2016 | Anderson et al. |
| 10,247,886 B2 | | 4/2019 | Rudenick et al. |
| 2003/0223724 A1 | | 12/2003 | Puetz et al. |
| 2007/0031100 A1 | | 2/2007 | Garcia et al. |
| 2007/0280618 A1 | | 12/2007 | Xin et al. |

(Continued)

FOREIGN PATENT DOCUMENTS

| | | | |
|---|---|---|---|
| EP | 1160605 A2 | 12/2001 | |
| WO | WO-2005050277 A2 * | 6/2005 | ........... G02B 6/4452 |
| WO | 2014077792 A1 | 5/2014 | |

OTHER PUBLICATIONS

Extended European Search Report for European Patent Application No. 21171595.8 dated Oct. 19, 2021. 8 pages.

*Primary Examiner* — Jennifer Doan
(74) *Attorney, Agent, or Firm* — Lerner, David, Littenberg, Krumholz & Mentlik, LLP

(57) ABSTRACT

This disclosure provides a fiber optic cable management system for cable distribution, organization and management. The fiber optic cable management system may provide features for cable routing, protection, separation and slack storage for the fiber optic cables placed, disposed or passed through the fiber optic cable management system. In one example, the fiber optic cable management system includes a front housing having a ceiling, a bottom structure, and side panels connecting the ceiling and the bottom structure. A rear housing is connected to the front housing. The rear housing has a frame assembly connected to the ceiling and the bottom structure. A plurality of patch panel supports disposed in the front housing configured to receive a patch panel assembly. A ceiling cable management structure formed on the ceiling, wherein the ceiling cable management structure defines at least two troughs on the ceiling.

15 Claims, 9 Drawing Sheets

(56) References Cited

U.S. PATENT DOCUMENTS

| | | |
|---|---|---|
| 2008/0013907 A1 | 1/2008 | Zumovitch et al. |
| 2008/0017760 A1 | 1/2008 | Larsen et al. |
| 2008/0175552 A1 | 7/2008 | Smrha et al. |
| 2010/0086273 A1 | 4/2010 | Rector, III |
| 2010/0141379 A1* | 6/2010 | Tucker ............... H04Q 1/114 361/679.02 |
| 2010/0296789 A1* | 11/2010 | Womack ............. G02B 6/4471 385/137 |
| 2013/0194772 A1 | 8/2013 | Rojo et al. |
| 2013/0330043 A1 | 12/2013 | Goldsmith et al. |
| 2014/0241691 A1 | 8/2014 | Solheid et al. |

\* cited by examiner

FIBER OPTIC CABLE DISTRIBUTION AND MANAGEMENT SYSTEM

BACKGROUND

The capabilities of fiber optic connectors, fiber optic cable and fiber optic hardware have been continuously advanced to meet the demands of increasing numbers of users and high transmission rate requirements. Fiber optic hardware is increasingly being used for a variety of applications, such as data transmission, video, broadband voice and the like. The fiber optic cable, connectors or electrical cables are connected to a fiber optic module mounted in a patch panel assembly disposed in a cable management rack located in a data distribution center or a server room.

Due to the increasing demand of bandwidth, a higher density connection with an increased number of fiber optic components and connectors in the fiber optic module is configured within a given space in a patch panel assembly. Multiple patch panel assemblies may then be stacked up in a cable management rack. Generally, fiber optic cable is purchased in predetermined lengths with connectors that have been installed in the manufacturing factory. Field operators must utilize these predetermined lengths of the cable, regardless whether the length is appropriate for the task at hand. When the two ends of the fiber optic cable is connected to equipment at the desired connection points, a certain amount of slack cable is often created, as the necessary result of the use of the predetermined lengths of the cable. However, the relatively fragile and delicate nature of the fiber optic cable make it difficult to store, bend, or bundle of the fiber optic cable as excessive stress applied to the fiber optic cable may seriously disrupt the signal transmitted therein. As a result, the effective management, collection or organization of the fiber optic cable in or between the cable management rack becomes a difficult task.

BRIEF SUMMARY

A fiber optic cable management system utilized to organize fiber optic cables and control the distribution of the organize fiber optic cables disposed therein. In one example, the fiber optic cable management system includes a front housing having a ceiling, a bottom structure, and side panels connecting the ceiling and the bottom structure. A rear housing is connected to the front housing. The rear housing has a frame assembly connected to the ceiling and the bottom structure. A plurality of patch panel supports disposed in the front housing configured to receive a patch panel assembly. A ceiling cable management structure formed on the ceiling, wherein the ceiling cable management structure defines at least two troughs on the ceiling.

In some examples, a dividing axis is formed in the ceiling cable management structure. The dividing axis defines a first portion and a second portion of the ceiling. A plurality of positioning posts is formed on the dividing axis of the ceiling cable management structure. A middle flange is formed in the dividing axis. At least a front side flange and a front edge flange are formed at a front side of the first portion. At least a rear side flange and a rear edge flange are formed at a rear side of the second portion. The front edge flange, front side flange and the middle flange define a first trough in the ceiling cable management structure. The rear edge flange, rear side flange and the middle flange define a second trough in the ceiling cable management structure.

In some examples, the first portion of the ceiling is defined by the front housing and the second portion of the ceiling is defined by the rear housing. The dividing axis is formed at an interface where the front housing is connected to the rear housing.

In some examples, a slack cable management structure is disposed in the front housing adjacent to the plurality of the patch panel supports. A plurality of bracket retainers is formed on a side of the slack cable management structure. The bracket retainers are configured to receive a cable from the ceiling cable management structure. Each of the plurality of bracket retainers includes an upper bracket and a lower bracket. The upper bracket is vertically offset from the lower bracket. A plurality of cable collectors is formed on a sidewall of the rear housing.

Another aspect of the disclosure provides a fiber optic cable management system including a front housing having a ceiling, a bottom structure, and side panels. A rear housing is connected to the front housing. The rear housing has a frame assembly connected to the ceiling and the bottom structure. A ceiling cable management structure is formed on the ceiling. A plurality of positioning posts is formed in the ceiling cable management structure. Each of the plurality of positioning posts is configured to divert a cable routed therethrough from a first incoming direction to a second outgoing direction different from the first incoming direction.

In some examples, a first trough and a second trough are formed in the ceiling cable management structure. The plurality of positioning posts is disposed between the first trough and the second trough.

In some examples, the first trough is defined in the front housing and the second trough is defined by the rear housing. A plurality of bracket retainers is formed on a side of the front housing and configured to receive the cable routed from the ceiling cable management structure.

Another aspect of the disclosure provides a method for managing cable distribution in a fiber optic cable management system. The method include routing a cable connected from a patch panel assembly to a ceiling cable management structure disposed in a fiber optic cable management system. The method further includes diverting the cable from a first incoming routing direction to a second outgoing routing direction by a plurality of positioning posts disposed in the ceiling cable management structure.

BRIEF DESCRIPTION OF THE DRAWINGS

FIG. 2B depicts a magnified view of a bracket retainer disposed in the fiber optic cable management system of FIG. 2A according to aspects of the disclosure.

FIG. 2C depicts a magnified view of a slack management spool disposed in the fiber optic cable management system of FIG. 2A according to aspects of the disclosure.

DETAILED DESCRIPTION

This disclosure provides a fiber optic cable management system for cable distribution, organization and management. The fiber optic cable management system may provide features for cable routing, protection, separation and slack storage for the fiber optic cables placed, disposed or passed through the fiber optic cable management system. In one example, the fiber optic cable management system includes a ceiling cable management structure that may assist routing or confining cable pathways in a fiber optic cable management system or among multiple fiber optic cable management systems. The enhanced management of the cable distribution on the ceiling may assist distribution or routing of the fiber optic cables across the neighboring fiber optic cable management systems so as to provide additional channels that allows the cables to run among different nearby or adjacent fiber optic cable management systems with minimum cable cluster or congestion.

Figure 1:
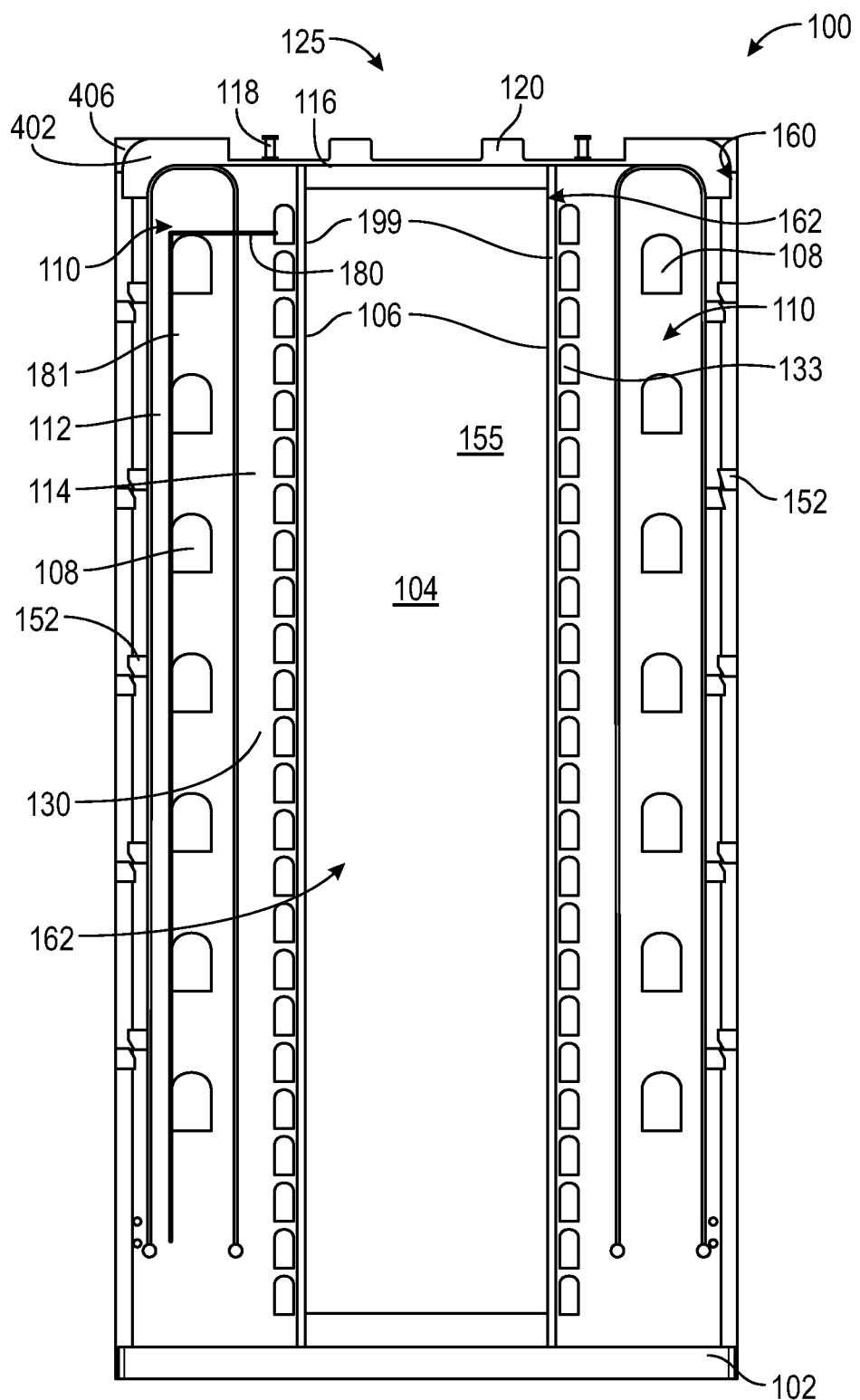
FIG. 1 depicts an example of a front view of a fiber optic cable management system according to aspects of the disclosure.

FIG. 1 depicts a fiber optic cable management system 100. The fiber optic cable management system 100 includes a ceiling 116, a bottom structure 102 connected by side panels 114 defining a front housing 162. A frame assembly 199 is connected to the side panels 114, in a back to back configuration, defining a rear housing 160 connecting to the front housing 162. The front and the rear housing 162, 160 share the ceiling 116 and the bottom structure 102. The front housing 162 defines a front interior volume 104 in open communication with a rear interior volume 155 defined in the rear housing 160. In one example, the side panels 114 have a vertical sidewall 106, such as a longitudinal sidewall, coplanar with a sidewall 144 (as shown in FIG. 2) of the frame assembly 199, thus in combination defining substantially similar dimensions of the front and the rear interior volume 104, 155 in the front and the rear housing 162, 160 respectively.

In one example, a plurality of patch panel supports 133 disposed on the side panels 114. Each pair of the patch panel supports 133 are horizontally aligned to receive a patch panel assembly disposed therein. The patch panel support 133 has a rail guild 202 configured to fit with a rail channel from the patch panel assembly to secure the patch panel assembly in the patch panel support 133.

In one example, a slack cable management structure 110 is coupled on the side panels 114. In the example depicted in FIGS. 1 and 2, two cable slack management structures 110 are included. It is noted that the cable slack management structure formed in the fiber optic cable management system 100 may be in any number, or sometimes only one cable slack management structure. The slack cable management 110 include a slack management panel 112 secured to the side panels 114. A plurality of slack management spools 108 are secured to the slack management panel 112. The slack management spools 108 are configured to hold loops of slack cable. Alternatively, the slack management spools 108 may be directly coupled to the side panels 114 as needed. The plurality of the slack management spools 108 are aligned in a generally vertical as well as a horizontal arrangement. The generally horizontal arrangement of the slack management spools 108 defines portions of a cable routing horizontal pathway 180. When a patch panel assembly (not shown) is placed on the patch panel support 133, the fiber optic cable connected from the two sides of the patch panel assembly may be routed through the slack management spools 108. The general vertical arrangement of the slack management spools 108 provides a cable routing vertical pathway 181 that allows the fiber optic cable to run downwardly or upwardly as needed without excessive bending of the fiber optic able. Details regarding the structure of the spool 108 will be described below with reference to FIGS. 2A and 2C.

In one example, the fiber optic cable management system 100 includes a ceiling cable management structure 125. The ceiling cable management structure 125 includes at least one front side flange 120, front edge flange 402, middle flange 406 and positioning post 118 disposed on the ceiling 116. The ceiling cable management structure 125 may provide additional cable collection channels that allow the cables from the nearby or adjacent fiber optic cable management system 100 to be routed therethrough. Thus, cable congestion or excess cable accumulation in or among different fiber optic cable management systems 100 may be avoided or organized, providing a high degree of organization of cable management for high cable connection density.

A plurality of bracket retainers 152 may be coupled to a side of the cable slack management structures 110. The bracket retainers 152 may assist collecting the fiber optic cables run from the ceiling cable management structure 125, providing a vertical cable passage that allows the fiber optic cables to route therethrough.

Figure 2A:
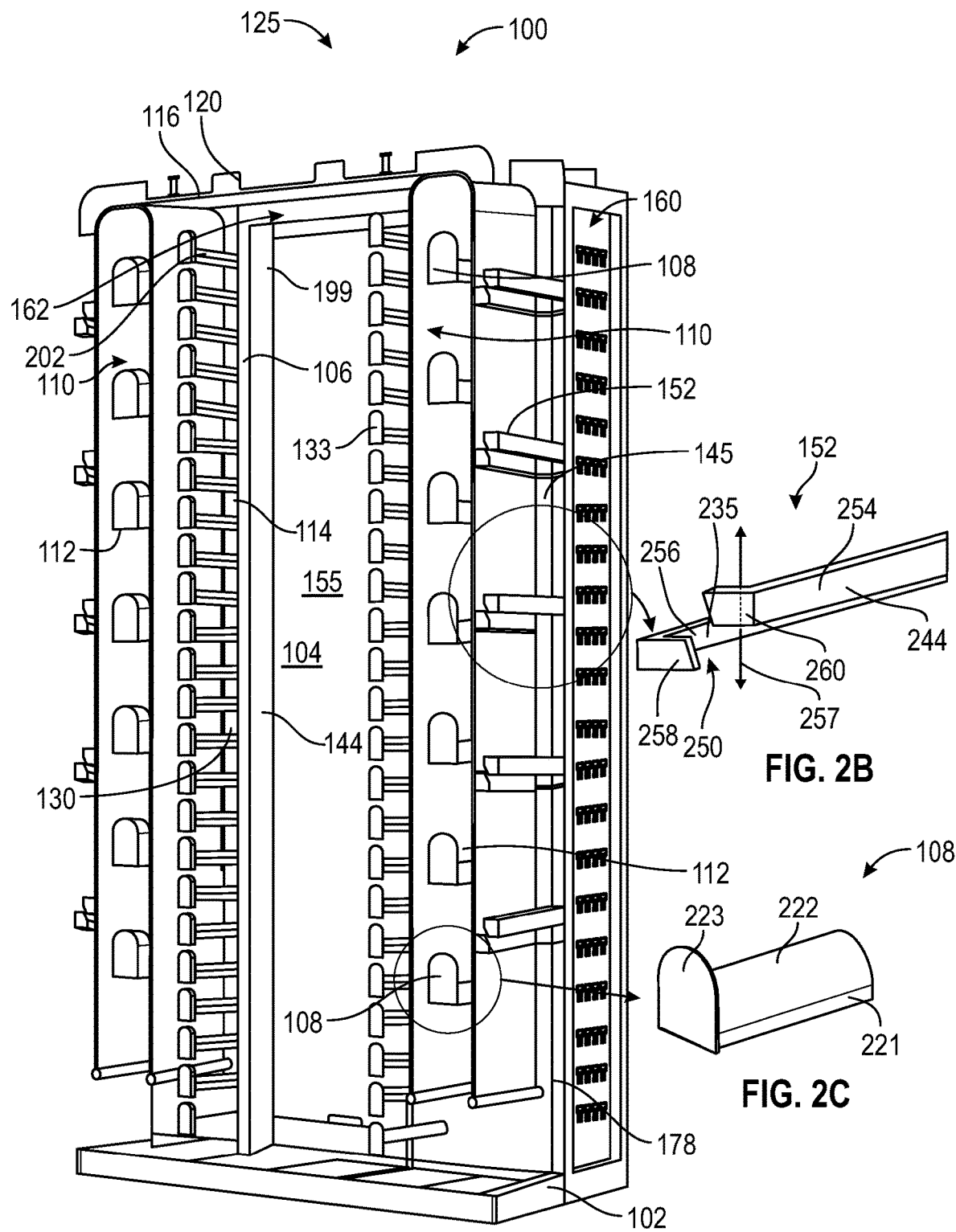
FIG. 2A depicts an example of a perspective view of a fiber optic cable management system according to aspects of the disclosure.

FIG. 2A depicts a perspective view of the fiber optic cable management system 100. The bracket retainers 152 includes an upper bracket 254 and a lower bracket 256, as show in the magnified view of FIG. 2B. The upper bracket 254 has an upper front lip 260 formed orthogonally to a body 244 of the upper bracket 254. Similarly, the lower bracket 256 has a lower front lip 258 formed orthogonally to a body 235 of the lower bracket 256. The upper front lip 260 and the lower front lip 258 may assist retaining the fiber optic cables in the space defined in the upper bracket 254 and the lower bracket 256, as shown by the arrow 257. In one example, the upper bracket 254 is disposed vertically offset from and above the lower bracket 256 so that a front surface of the upper front lip 260 does not horizontally mate with a front surface of the lower front lip 258. In other words, at least a portion of the upper bracket 254 and the lower bracket 256 are not horizontally aligned. The misalignment of the upper bracket 254 and the lower bracket 256 provides a front gap 250 that allows a relatively easy access of the fiber optic cables to run therethrough and maintain the fiber optic cables in the bracket retainers 152. In one example, the lower bracket 256 may be attached to a side of the cable slack management structures 110 while the upper bracket 254 may be attached to a rear side 145 of the frame assembly 199. The bracket retainers 152 are spaced at regular intervals vertically along the side of the cable slack management structures 110. It is noted that the bracket retainers 152 may be disposed in any suitable locations that is in close proximity to the cable slack management structures 110 and/or the ceiling cable management structure 125 and, particularly, downward from the ceiling cable management structure 125 to collect the cables routing therefrom.

In one example, the slack management spools 108 have an elongate, substantially half-cylindrical shaft 221 and a curved upper surface 222 for contacting the cable, as shown in the magnified view in FIG. 2C. An end flange 223 formed at a front end of the slack management spool 108 prevents coils of cable from slipping off. The slack management spools 108 are spaced at regular intervals vertically along the slack management panel 112. In one example, the slack management spools 108 are removably secured to the slack management panel 112 by snap fittings (not shown) that cooperate with a mounting aperture (not shown) in the slack management panel 112. Alternatively, the slack management spools 108 may be attached to the slack management panel 112 using any suitable fastening mechanisms, such as glue attaching, screw and/or bolt mounting, hooking, knot tying, suturing or any suitable fastening manners to secure the slack management spools 108 to the slack management panel 112.

In one example, the slack management spools 108 have a radius of between about 1 inch to about 3 inch to impart bend radius control to prevent excessive bending of the loop of slack cable passing over the slack management spools 108, since excessive bending of fiber optic cable may cause cable breakage and will, over time, damage the cable and overall performance of the cable. The combination of the curved cable contacting surface 222, and the substantially half-cylindrical shaft 221 create a substantially semi-circular or crescent-shaped cross-section, as shown in the magnified view in FIG. 2C. The half-cylinder shape of the slack management spools 108 provides greater clearance for cable passing over the slack management spools 108 immediately below, thus allowing the center-to-center distance between slack management spools 108 to be decreased without impairing the ability of a field technician to access the cable looped over a given spool and without decreasing the amount of cable that may be looped over a given spool. Accordingly, more spools may be located within the same area as compared to fully cylindrical spools, thus allowing more slack cable to contained within the same area, allowing for higher connection density and providing more options for placement of slack cable, allowing the field technician to efficiently manage slack cable without unduly stretching the cable or creating excessively large loops of slack cable.

Figure 3:
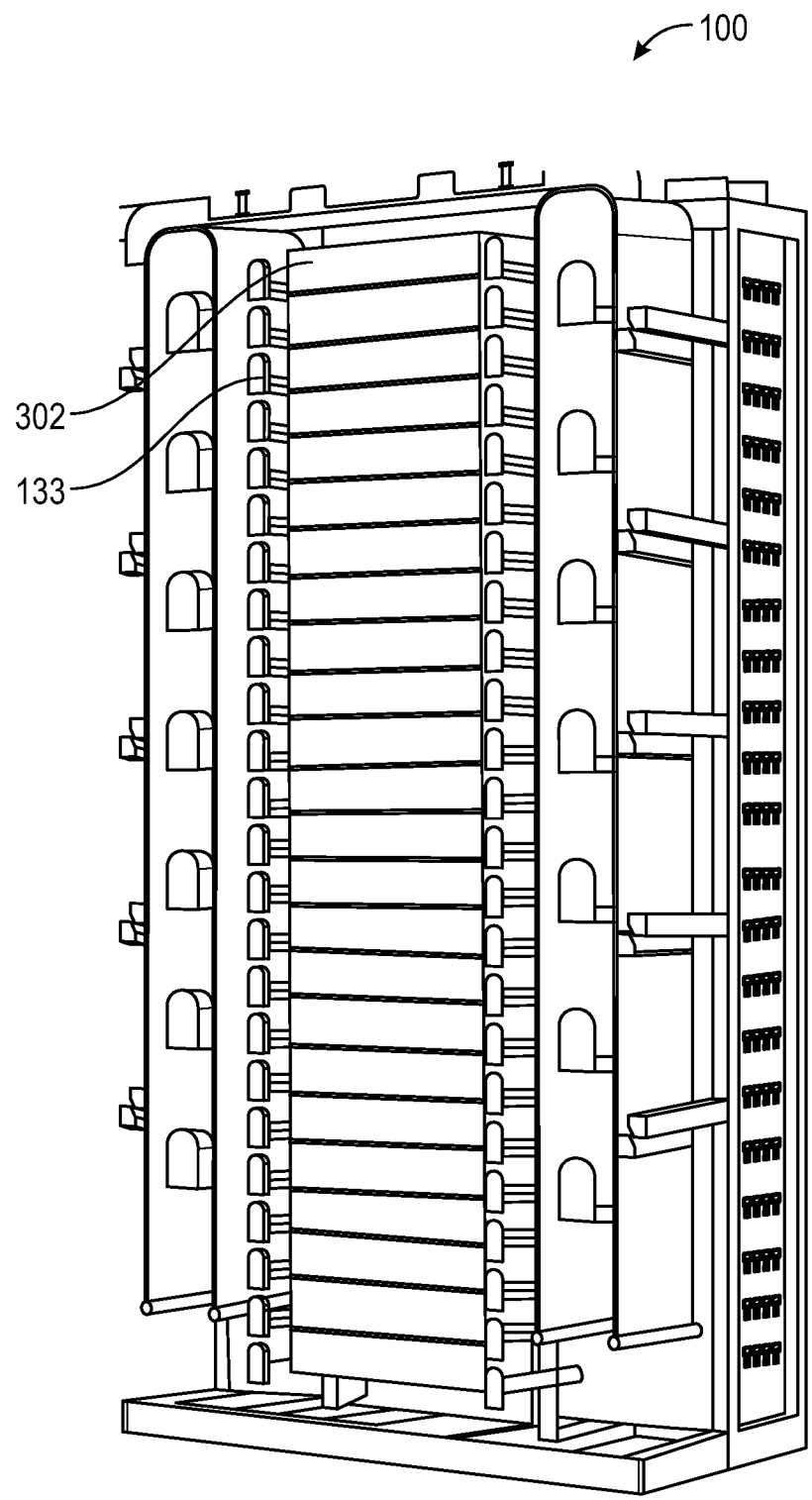
FIG. 3 depicts an example of a perspective view of a fiber optic cable management system with multiple patch panel assemblies mounted therein according to aspects of the disclosure.

FIG. 3 depicts a front view of the fiber optic cable management system 100 having a plurality of patch panel assemblies 302 disposed therein. As discussed above, the patch panel assemblies 302 may be placed in the patch panel supports 133. Each patch panel assembly 302 may have a predetermined numbers of the fiber optic connectors and/or adaptor modules disposed therein as needed for cable connection. It is noted that though only twenty four patch panel assemblies are shown in FIG. 3, it is noted that the patch panel assemblies disposed in the fiber optic cable management system 100 may be in any numbers, such as in partial or full capacity, based on the requirement.

Figure 4:
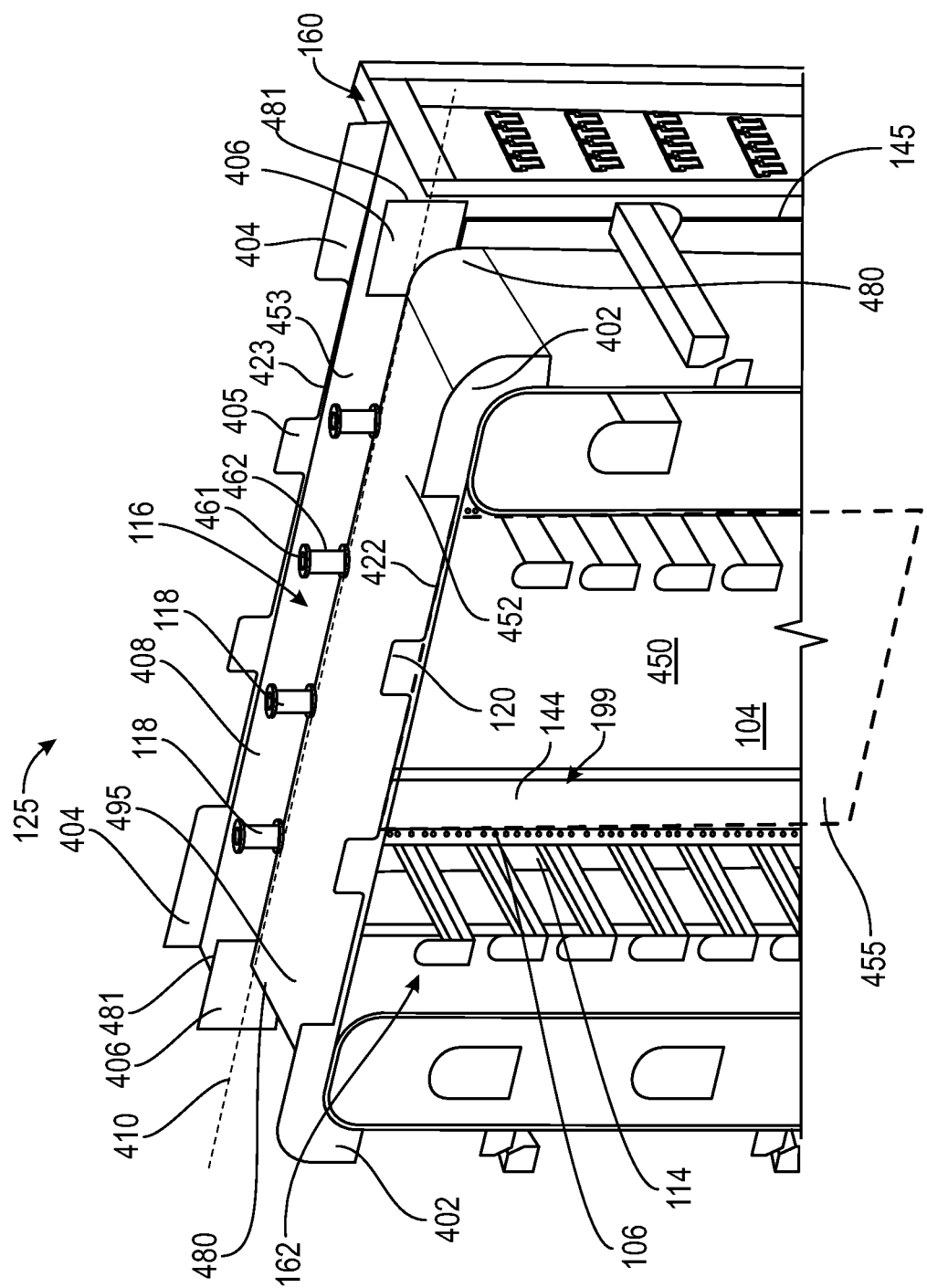
FIG. 4 depicts a top perspective view of a top portion of a fiber optic cable management system according to aspects of the disclosure.

FIG. 4 depicts a top front view of the ceiling cable management structure 125 disposed on the ceiling 116. The ceiling 116 includes a front portion 495 defined by the front housing 162 and a rear portion 408 defined by the rear housing 160. A dividing axis 410 is formed in the ceiling 116 dividing the ceiling 116 into the front portion 495 and the rear portion 408. The dividing axis 410 may also be defined by a vertically extending plane defined by the front and rear interior volume 104, 155, shown by the dotted line 455. The vertically extending plane may be also defined by an interface where the vertical sidewall 106 of the side panel 114 mates with the sidewall 144 of the frame assembly 199, such as the interface where the front housing 162 and the rear housing 160 are connected.

In one example, a plurality of positioning posts 118 may be disposed along the dividing axis 410 that may help routing and positioning the cables passing therethrough as needed for control distribution management and control. The middle flange 406 may be formed at the two corner rear ends 480 of the front housing 162 or at the two corner front ends 481 of the rear housing 160 to assist constraining and confining the cable pathway routed therethrough.

In one example, a plurality of flanges, such as at least one front side flange 120 and front edge flange 402 or the like, are disposed on a front side 422 of the front portion 495 of the ceiling 116 defined in the front housing 162. Similarly, a plurality of flanges, such as at least one rear side flange 405 and the rear edge flange 404 and the like, may be disposed on a rear side 423 of the rear portion 408 of the ceiling 116 in the rear housing 160. The flanges 120, 402, 405, 404, 406 provide different pathways or troughs that allow cable from different directions to be routed therethrough with minimum excessive bending or cable congestion. The flanges 120, 402, 404, 405 are configured to confine and lead the cables routing therethrough to the nearby cable management systems are needed. In one example, the flanges 120, 402, 404, 405 may have a height between about 0.5 inch and about 5 inches, such as between about 1 inch and about 3 inches.

In one example, the middle flange 406 formed in the dividing axis 410 in combination with the front side flange 120 and the front edge rough 402 define a front trough 452 that allows the cables passing therethrough to be directed to a front housing in a nearby or neighboring fiber optic cable management system. The middle flange 406 formed in the dividing axis 410 in combination with the rear side flange 405 and the rear edge rough 404 define a rear trough 453 that allows the cables passing therethrough to be directed to a rear housing in a nearby or neighboring fiber optic cable management system. Thus, in the example depicted in FIG. 4, the ceiling cable management structure 125 defines at least two troughs that allows the cables to route therethrough as needed.

In one example, the positioning posts 118 disposed on the dividing axis 410 is configured to provide additional path confining structures so as to confine pathway of the fiber optic cables routed therethrough as needed. For example, when the inbound cables or outbound cables are desired to route or divert to different locations, such as to a rear housing or a front housing, of a nearby fiber optic cable management system, the positioning posts 118 may assist confining or diverting the cable to run through the front trough 452, the rear trough 453, or initially from the front trough 452 then diverted to the rear trough 453, or vice versa. Accordingly, in some examples, the positioning posts 118 may provide a pivot point that may divert the inbound or outbound cables to a desired pathway as needed. Thus, the plurality of positioning posts formed in the ceiling cable management structure may divert a cable routed therethrough from a first incoming direction to a second outgoing direction different from the first incoming direction.

In one example, the positioning posts 118 may have a cylindric body 462 having a height between about 1 inch and about 4 inches. In some examples, a disk-like cap 461 may be formed on one or two ends of the cylindric body 462. The disk-like cap 461 generally has a diameter greater than a diameter of the cylindric body 462 so as to retain the cable around the cylindric body 462 and prevent the cable from slipping off the positioning posts 118.

Figure 5A:
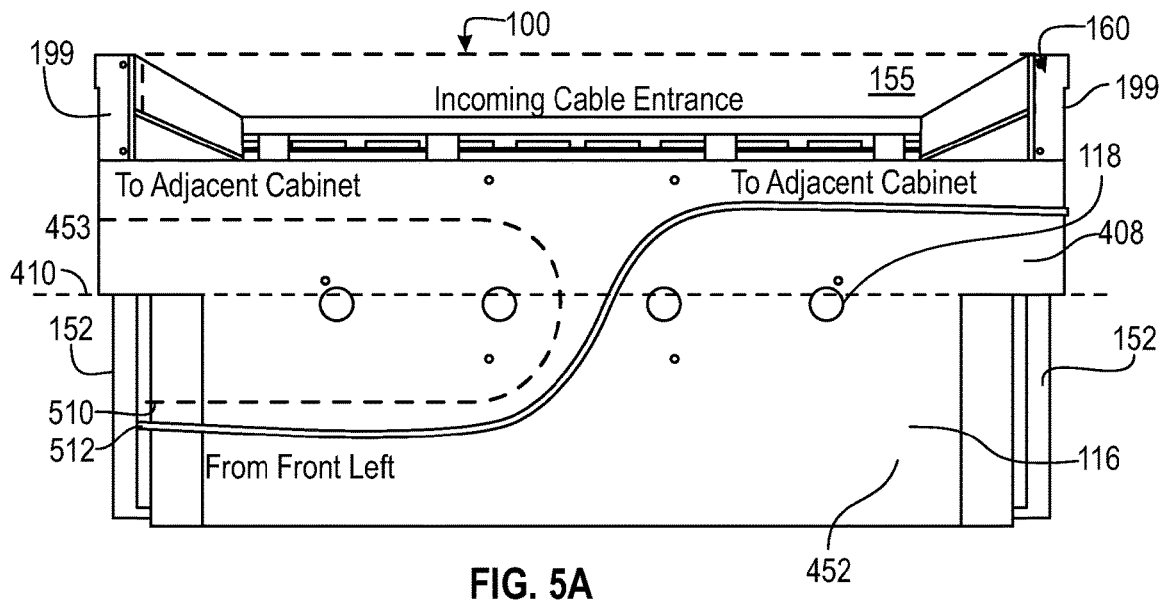
FIGS. 5A-5B depict a top view of a ceiling of a fiber optic cable management system with different cable routing configurations according to aspects of the disclosure.
Figure 5B:
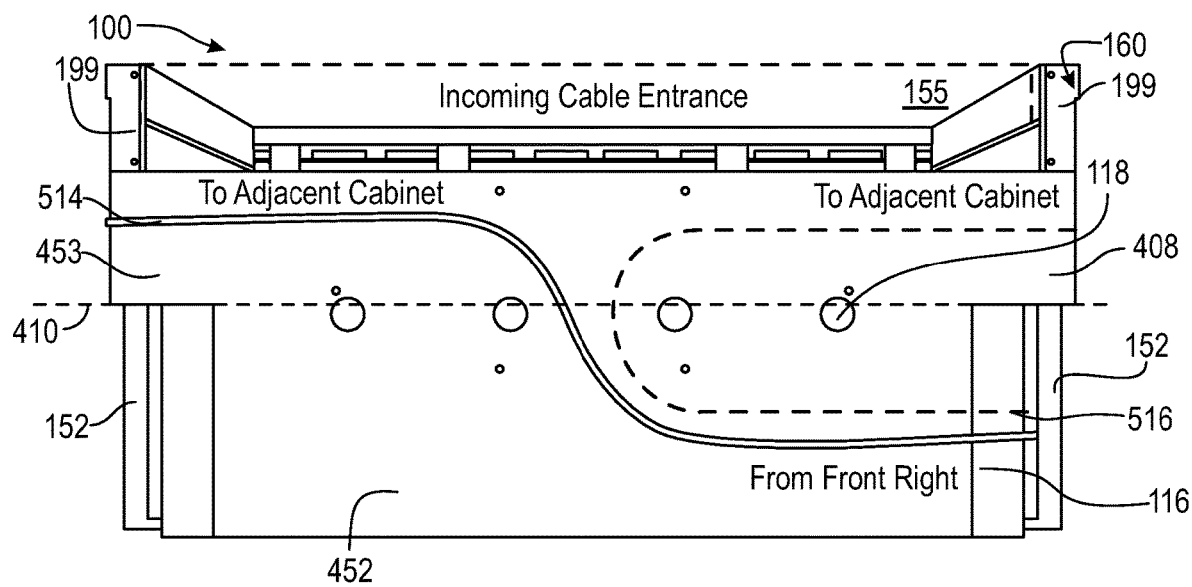

FIGS. 5A and 5B depicts two examples of cable routing arrangements for the cables routed through the ceiling cable management structure 125 of the fiber optic cable management system 100. In the example depicted in FIG. 5A, the cable may be coming from a left bracket retainer 152 from the front housing 162. The cable may be directed to a neighboring fiber optic cable management system, such as to a right neighboring system as shown in the solid line 512 or to a left neighboring system shown in the dotted line 510. The positioning post 118 may divert the cable to the target destination from the front trough 452 to different sections of the rear trough 453. Alternatively, in the example depicted in FIG. 5B, the cable may be coming from a right bracket retainer 152 from the front housing 162. The cable may be directed to a neighboring fiber optic cable management system, such as to a right neighboring system as shown in the dotted line 516 or to a left neighboring system shown in the solid line 514. The positioning post 118 serves as a pivot point that may divert the cable to the target destination from the front trough 452 to different sections of the rear trough 453. In some examples, the cable from the rear interior volume 155 of the rear housing 160 may be directed through the ceiling cable management structure 125 to the front interior volume 104 of the front housing 162.

Figure 6:
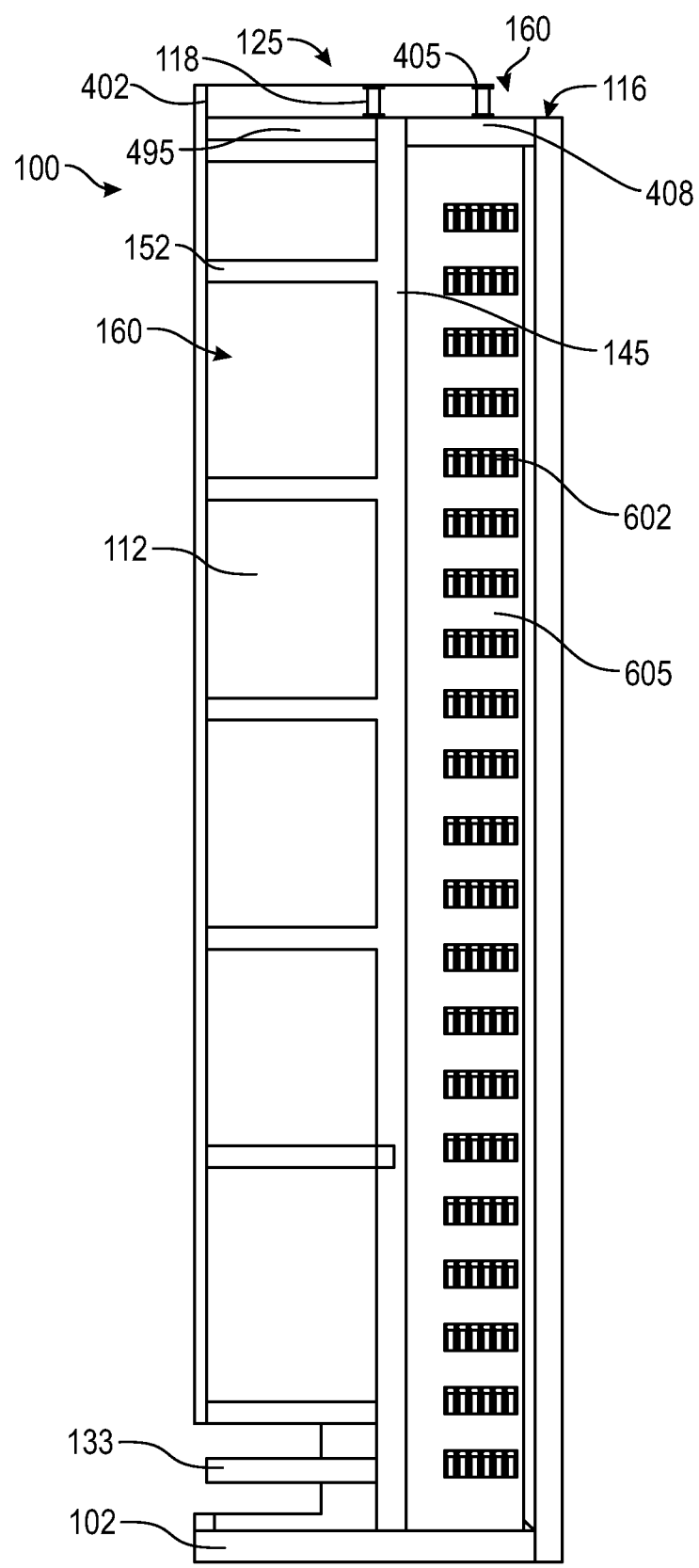
FIG. 6 depicts an example of a side view of a fiber optic cable management system according to aspects of the disclosure.

FIG. 6 depicts a side view of the fiber optic cable management system 100. The ceiling cable management structure 125 is disposed on the ceiling 116 defined from both the front housing 162 and the rear housing 160. The rear side 145 of the rear housing 160 is in connection with at least a portion of the bracket retainers 152. A plurality of the cable channels 602 may be formed on the side panel 605 of the rear housing 160. The cable channels 602 may collect the cable from the patch panel assemblies disposed in the fiber optic cable management system 100.

Figure 7B:
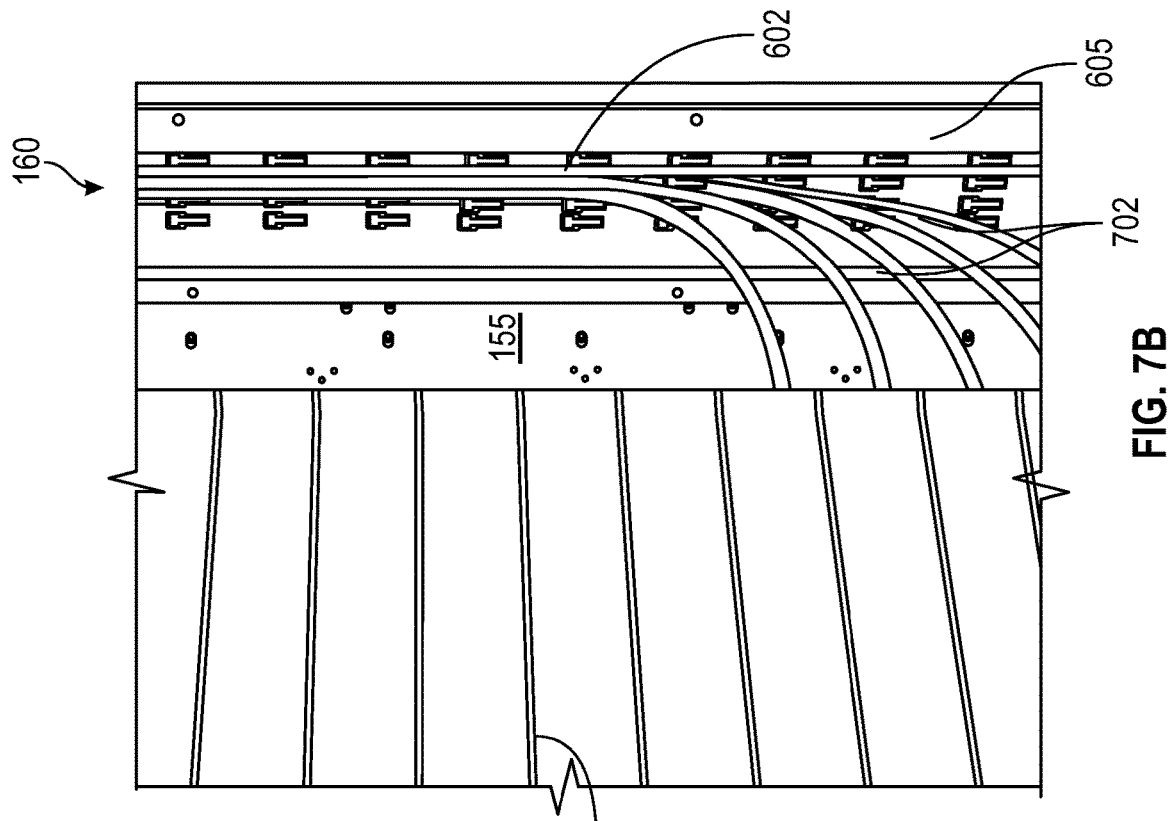
FIG. 7B depicts a magnified view of a cable collector in the fiber optic cable management system of FIG. 7A according to aspects of the disclosure.
Figure 7A:
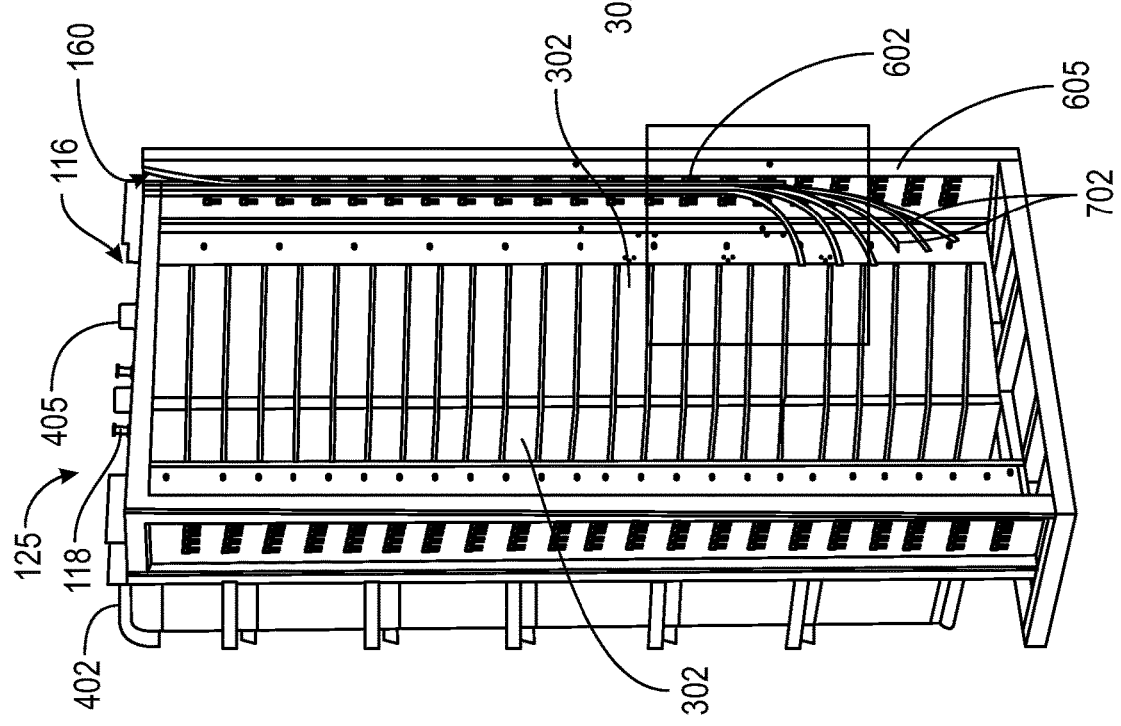
FIG. 7A depicts a rear view of a fiber optic cable management system according to aspects of the disclosure.

FIG. 7A depicts a rear end review of the fiber optic cable management system 100. The rear housing 160 defines the rear interior volume 155 configured to receive a portion of the patch panel assemblies while maintaining another portion of the patch panel assemblies in the front housing 162. The cables 702 from the patch panel assemblies 302 may be routed upwardly, being collected by the cable collector 602 extending vertically up to the ceiling cable management structure 125. As shown in the magnified view of the cable collector 602 in FIG. 7B, the cable collectors 602 may be formed in the sidewalls 605 of the rear housing 160. After the plurality of the cables 702 from each or some of the patch panel assemblies 302 are collected and reached to the ceiling cable management structure 125 in the ceiling 116, the cable 702 may then be further diverted or distributed by the ceiling cable management structure 125 with different pathway options to the nearby or neighboring fiber optic cable management systems, or to the front housing 162 of the fiber optic cable management system 100 as needed.

Figure 8:
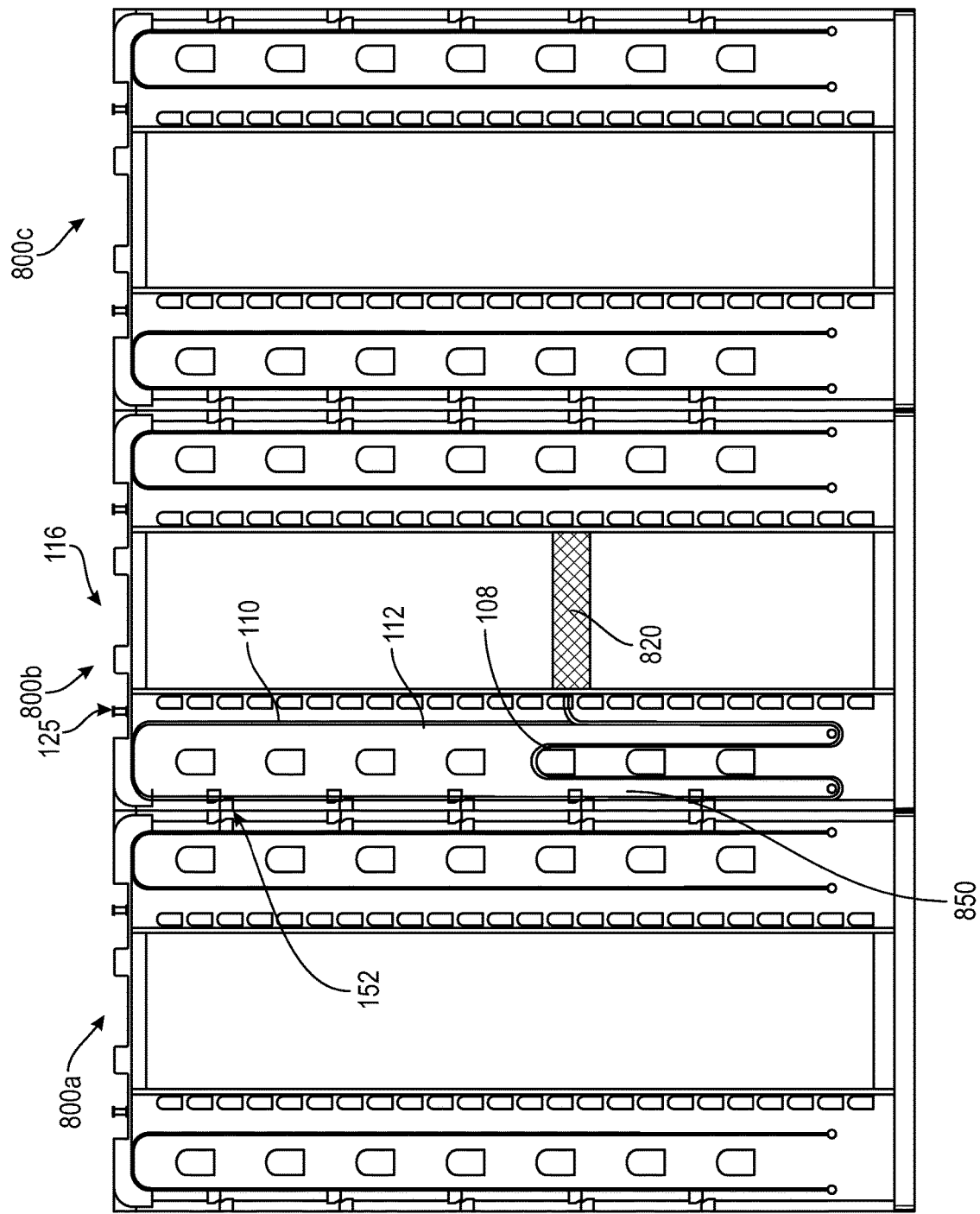
FIG. 8 depicts multiple fiber optic cable management systems placed in a side by side configuration according to aspects of the disclosure.

FIG. 8 depicts a series of the systems, such as the multiple fiber optic cable management systems 800a, 800b, 800c, may disposed in a side by side configuration, abutting each other by the sidewalls. The multiple fiber optic cable management systems 800a, 800b, 800c may be similar to or the same as the fiber optic cable management system 100 described above. In one example, the cable 850 may run through the ceiling cable management structure 125 from the ceiling 116, passing downwardly through the space defined through the bracket retainers 152 to a bottom of the fiber optic cable management system 800b. The cable 850 may then be routed through the slack management panel 112 defined by the cable slack management structures 110 to one of the slack management spools 108 located at a height close to the target patch panel assembly 820. It is noted that the cable may reach to any of the patch panel assembly any at height disposed in the fiber optic cable management system. The cable 850 may then be positioned in a height ready to be connected to the patch panel assembly 820. It is noted that the routing may be in a reversed direction, such as the cable 850 extending from the patch panel assembly 820, routing through the slack management spools 108, passing through the bracket retainers 152 to the ceiling 116, which may be further distributed, diverted and/or controlled by the ceiling cable management structure 125 disposed thereon.

Figure 9A:
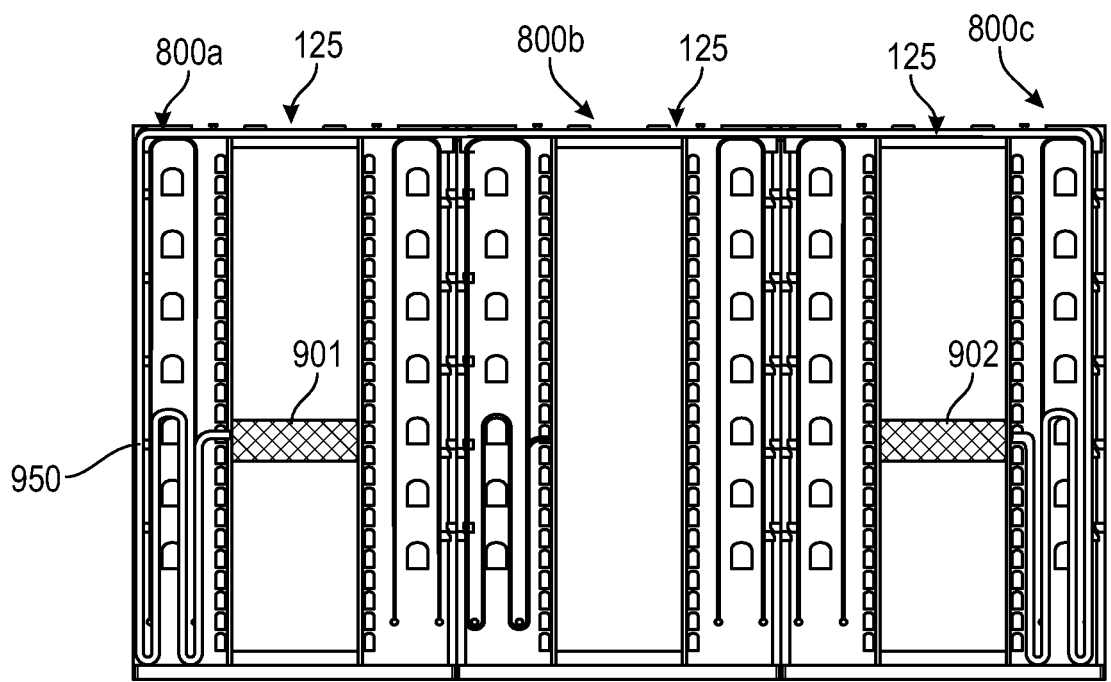
FIGS. 9A-9B depict different examples of different cable routing managements in multiple fiber optic cable management systems placed in a side by side configuration according to aspects of the disclosure.
Figure 9B:
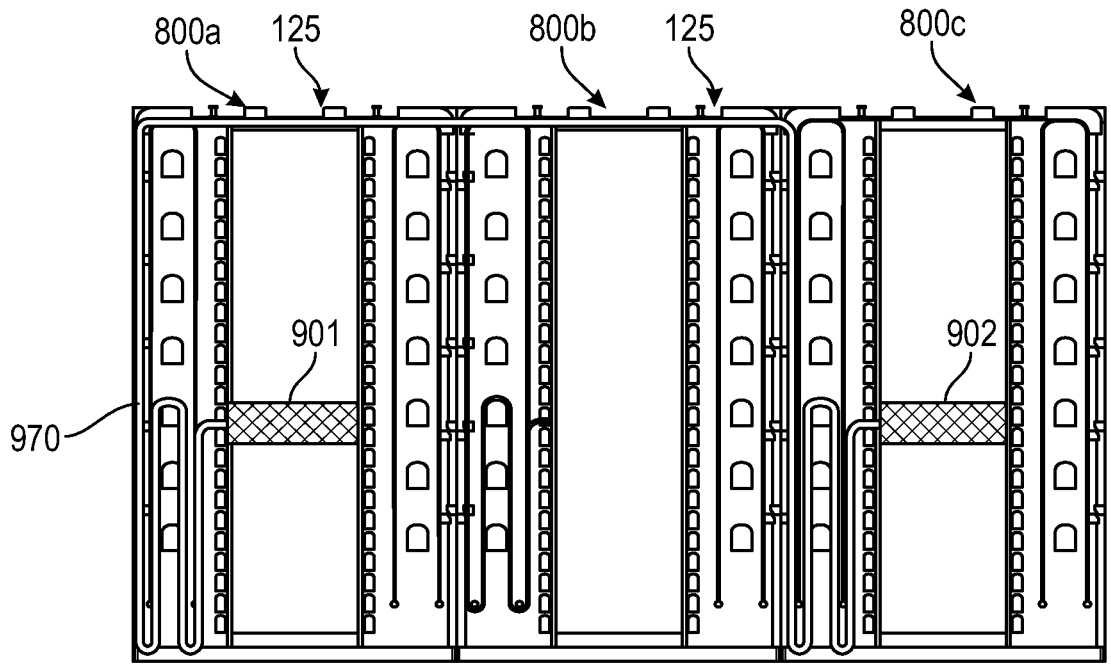

FIGS. 9A-9B depict yet another two different examples of cable routing arrangements in series of the systems, such as the multiple fiber optic cable management systems 800a, 800b, 800c. FIGS. 9A-9B depict multiple cable pathway options made possible by the various horizontal and vertical cable pathways of the multiple fiber optic cable management systems 800a, 800b, 800c. In the example depicted in FIGS. 9A-9B, the cable may be routed to provide electric communications of the fiber optic connectors disposed in the patch panel assemblies 901, 902 at located at the two end systems 800a, 800c of the arrays of the multiple fiber optic cable management systems 800a, 800b, 800c, such as the fiber optic cable management systems 800a, 800c. Thus, the cable 950, 970 may only run through the ceiling cable management structure 125 of the middle fiber optic cable management system 800b without routing downward to be in electric connection to the fiber optic connectors disposed in the patch panel assembly disposed in the middle fiber optic cable management system 800b.

In the example depicted in FIG. 9A, the cable 950 from a first patch panel assembly 901 is routed through a left cable slack management structures from the first fiber optic cable management system 800a, such as a left most system, to the ceiling cable management structure 125 disposed on the ceiling of the first fiber optic cable management system 800a. The ceiling cable management structure 125 may then extend and divert the cable 950 horizontally to the ceiling cable management structure 125 disposed on the ceiling of the third fiber optic cable management system 800c, such as a right most system. The cable 950 may then directed to the right cable slack management structures to be further directed or reached to a location where a second patch panel assembly 902, such as a target patch panel assembly, is located. The direct cable connection configuration at the two end systems 800a, 800c allows the electric communication of the fiber optic connectors disposed at the two end systems 800a, 800c to be in direct communication, skipping some of the systems disposed therebetween, such as the middle fiber optic cable management system 800b, so as to save the routing pathways and promote cable distribution efficiency.

In the example depicted in FIG. 9B, similarly, the cable 970 from the first patch panel assembly 901 is routed through a left cable slack management structures from the first fiber optic cable management system 800a, such as a left most system, to the ceiling cable management structure 125 disposed on the ceiling of the first fiber optic cable management system 800a. The ceiling cable management structure 125 may then extend and divert the cable 950 horizontally to the ceiling cable management structure 125 disposed on the ceiling of the third fiber optic cable management system 800c, such as a right most system. The cable 950 may then directed to the left cable slack management structures to be further directed or reached to a location where the second target patch panel assembly 902, such as the target patch panel assembly, is located. Thus, the target patch panel assembly 902 depicted in FIGS. 9A and 9B may be connected either from the left or right cable slack management structures of the third fiber optic cable management system 800c as needed. It is noted that the cable may be configured to connect to the patch panel assemblies disposed in any height or locations in the fiber optic cable management system. The direct cable connection configuration at the two end systems 800a, 800c allows the electric communication of the fiber optic connectors disposed at the two end systems 800a, 800c to be in direct communication, skipping some of the systems disposed therebetween, so as to save the routing pathways and promote cable distribution efficiency.

Thus, a fiber optic cable management system for cable distribution, organization and management is provided in the present application. The fiber optic cable management system includes a ceiling cable management structure that may assist routing or confining cable pathways in a fiber optic cable management system or among multiple fiber optic cable management systems. The ceiling cable management structure formed on the ceiling of the fiber optic cable management system provides additional channels where the cable may be routed therethrough and divert the cable connections to other fiber optic cable management systems as needed. Thus, flexible routing options as well as high degree of cable organization may be obtained.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible implementations. Further, the same reference numbers in different drawings can identify the same or similar elements.

The invention claimed is:

1. A fiber optic cable management system, comprising:
a front housing having a ceiling, a bottom structure, and side panels connecting the ceiling and the bottom structure;
a rear housing connected to the front housing, the rear housing having a frame assembly connected to the ceiling and the bottom structure;
a plurality of patch panel supports disposed in the front housing configured to receive a patch panel assembly;
a ceiling cable management structure formed on the ceiling, wherein the ceiling cable management structure defines at least two troughs on the ceiling;
a dividing axis formed in the ceiling cable management structure, defining a first portion and a second portion of the ceiling; and
a plurality of positioning posts formed on the dividing axis of the ceiling cable management structure.

2. The fiber optic cable management system of claim 1, further comprising:
a middle flange formed in the dividing axis.

3. The fiber optic cable management of claim 2, wherein the ceiling cable management structure further comprises:
at least a front side flange and a front edge flange formed at a front side of the first portion; and
at least a rear side flange and a rear edge flange formed at a rear side of the second portion.

4. The fiber optic cable management system of claim 3, wherein the front edge flange, front side flange and the middle flange define a first trough in the ceiling cable management structure.

5. The fiber optic cable management of claim 3, wherein the rear edge flange, rear side flange and the middle flange define a second trough in the ceiling cable management structure.

6. The fiber optic cable management system of claim 1, wherein the first portion of the ceiling is defined by the front housing and the second portion of the ceiling is defined by the rear housing.

7. The fiber optic cable management system of claim 1, wherein the dividing axis is formed at an interface where the front housing is connected to the rear housing.

8. The fiber optic cable management system of claim 1, further comprising:
a slack cable management structure disposed in the front housing adjacent to the plurality of the patch panel supports.

9. The fiber optic cable management system of claim 8, further comprising:
a plurality of bracket retainers formed on a side of the slack cable management structure.

10. The fiber optic cable management system of claim 9, wherein the bracket retainers are configured to receive a cable from the ceiling cable management structure.

11. The fiber optic cable management system of claim 9, wherein each of the plurality of bracket retainers comprises:
an upper bracket; and
a lower bracket, wherein the upper bracket is vertically offset from the lower bracket.

12. The fiber optic cable management system of claim 1, further comprising:
a plurality of cable collectors formed on a sidewall of the rear housing.

13. A fiber optic cable management system, comprising:
a front housing having a ceiling, a bottom structure, and side panels;
a rear housing connected to the front housing, the rear housing having a frame assembly connected to the ceiling and the bottom structure;
a ceiling cable management structure formed on the ceiling;
a plurality of positioning posts formed in the ceiling cable management structure, wherein each of the plurality of positioning posts is configured to divert a cable routed therethrough from a first incoming direction to a second outgoing direction different from the first incoming direction; and
a first trough and a second trough formed in the ceiling cable management structure, wherein the plurality of positioning posts is disposed between the first trough and the second trough.

14. The fiber optic cable management system of claim 13, wherein the first trough is defined in the front housing and the second trough is defined by the rear housing.

15. The fiber optic cable management system of claim 13, further comprising:
 a plurality of bracket retainers formed on a side of the front housing and configured to receive the cable routed from the ceiling cable management structure.

\* \* \* \* \*